Patented Feb. 2, 1932

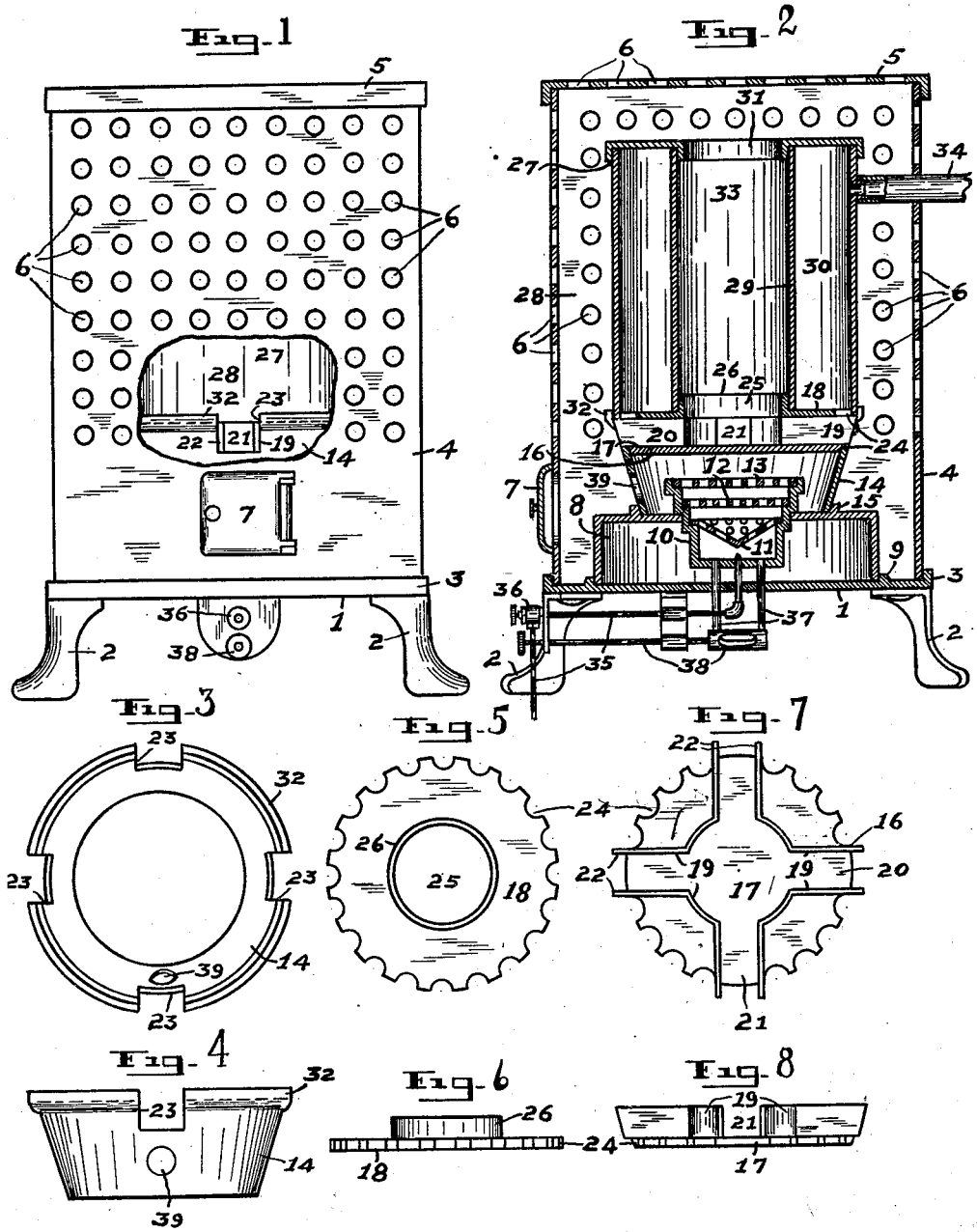

1,843,310

UNITED STATES PATENT OFFICE

MICHAEL ZIPPLER, JR., OF CHATTANOOGA, TENNESSEE

HEATING APPARATUS

Application filed November 29, 1930. Serial No. 498,946.

My invention relates to certain new and useful improvements in heating apparatus utilizing gas for fuel, and while the embodiment of the invention is herein disclosed as adapted to an individual heating stove, it will be obvious that the principle of the invention may be successfully employed in heating furnaces or for any other purpose wherein it is found to be applicable.

Important objects of the invention are to provide a heating apparatus, of the character described, which will function to radiate and diffuse a high degree of heat on a relatively low fuel consumption, which is simple in its construction and arrangement, compact, safely operable, which embodies parts that are readily accessible and removable, which is durable and efficient in its use, and comparatively inexpensive to manufacture and economical to operate.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawings wherein like numerals of reference designate corresponding parts throughout the several views:—

Figure 1 is a front elevational view of a heating stove constructed in accordance with the invention.

Figure 2 is a vertical cross sectional view thereof.

Figures 3 and 4 are, respectively, top plan and side views of the lower fire pot.

Figures 5 and 6 are, respectively, top plan and side views of the top plate of the flame spreader.

Figures 7 and 8 are, respectively, top plan and side views of the flame spreader without the top plate thereof.

Referring in detail to the drawings 1 denotes a rectangularly shaped stove bottom, which is supported at each corner by a leg 2, and provided with an upturned flange 3 extending around its entire perimeter. A rectangularly shaped casing 4, providing a hot air chamber and having an open lower end, is removably mounted on the bottom 1 and maintained on the latter by its engagement with the bottom flange 3. The casing 4 is provided with a top cover 5, which is preferably removable but may be fixed in position if desired.

All of the walls of the casing 4, and the top cover 5 of the latter, are formed with a plurality of perforations 6 for permitting the passage and emanation of heat from within the casing 4. The front wall of the casing 4 is further provided with a hinged door 7, which is disposed adjacent to the lower end thereof to allow access to the interior of the casing 4 for any purposes required.

A cylindrical base 8 having an open lower end, is removably mounted on the center of the stove bottom 1, and maintained in position by an annular rib 9 formed on the latter. The top of the base 8 is provided with a centrally disposed opening, in which a stepped burner housing 10 is removably suspended. A perforated, conically shaped fuel spreader 11 is removably mounted in the lower portion of the burner housing 10, and a pair of flat, perforated burner plates, respectively indicated at 12 and 13, are removably mounted in the upper portion of the latter. The burner plates 12 and 13 are disposed horizontally parallel in superposed spaced relation with respect to each other. The stepped construction of the burner housing 10 provides a suitable structure for seating the gas spreader 11 and the burner plates 12 and 13, as clearly shown in Figure 2.

A cylindrical tapering fire pot 14, having open upper and lower ends, is removably mounted on top of the base 8. The base 8 is provided with an annular rib 15, which engages the lower end of the lower fire pot 14 for maintaining the latter in position on the base 8.

A flame spreader 16 is removably mounted in the upper portion of the fire pot 14 and consists of a flat, circular, lower spreader plate 17 and a similarly shaped upper spreader plate 18. The flame spreader plates 17 and 18 are positioned horizontally and spaced from each other by a plurality of vertically disposed flanges 19, which are formed integral with the top of the lower spreader plate 17. The upper spreader plate 18 rests upon the top of the flanges 19, and the arangement of the latter forms a pair of air passages, respectively indicated at 20 and 21, between the upper and lower flame spreader plates 17 and 18. The air passages 20 and 21 intercommunicably intersect each other at the center of the spreader plates 17 and 18, and extend at right angles relatively to each other.

The outer ends 22, of the flanges 19, project beyond the periphery of the lower spreader plate 17, and seat in respective recesses 23, which are formed in the top edge margin of the fire pot 14. The recesses 23 establish open ends for the air passages 20 and 21, thereby providing communication between the latter and the interior of the casing 4. The engagement of the flange ends 22, in the recesses 23 supports and maintains the entire flame spreader 16 within the fire pot 14.

The spreader plates 17 and 18 are provided with similar, scalloped or serrated peripheral edge margins 24 providing passage openings for the fire flame therethrough. The upper spreader plate 18 is further provided with a centrally disposed opening 25, which is surrounded by a vertically disposed, annular flange 26 formed integral with the top of the upper spreader plate 18.

A vertically disposed heating cylinder 27 is removably mounted on the top of the fire pot 14 and flame spreader 16. The heating cylinder 27 consists of an outer shell 28 and an inner shell 29 forming an annular heating chamber 30 therebetween. The top of the heating chamber 30 is closed by an annular cover 31 and the lower end thereof is open. The lower end of the outer shell 28 seats upon the top of the fire pot 14 and is maintained thereon by an annular flange 32 formed integral with the upper end of the fire pot 14, the lower end of the inner shell 29 is engaged by the annular flange 26, of the upper spreader plate 18.

The inner shell 29 provides an air passage 33 having an open upper end communicating with the interior of the casing 4. The lower end of the air passage 33 communicates with the flame spreader air passages 20 and 21, through the opening 25 formed in the upper spreader plate 18.

A flue pipe 34, for providing proper draught action to promote combustion, communicably joins the upper end of the heating chamber 30 with some suitable flue stack structure.

Fuel gas is supplied by a suitable conduit 35 provided with the usual control valve 36 and having its outlet mounted in the bottom of the burner housing 10 directly beneath the depending lower end of the conically shaped gas spreader 11. The proper air mixture is supplied through separate air conduits 37, which communicate with the burner housing 10 below the conically shaped gas spreader 11. The air conduits 37 are provided with a suitable regulating element 38 to establish the proper fuel admixture.

The fire pot 14 is provided with an opening 39, at the front thereof, which, in conjunction with the casing door 7, permits the convenient lighting of the fuel in the burner element, and further permits viewing of the combustion when establishing its adjustment.

The fuel admixture, in entering the burner housing 10, through the gas and air conduits 35 and 37, will be spread in passing through the conically shaped fuel spreader 11 and the two superposed burner plates 12 and 13. The fire flame, through the draught action of the flue pipe 34, will be drawn upwardly into the heating chamber 30 through the passage openings in the edge margins of the two flame spreader plates 17 and 18, whereby the heating cylinder 27 will be constantly maintained at a very high temperature.

The constant circulation of the air through the air passages 20 and 21, of the flame spreader 16, which latter is constantly subjected to an intense direct fire, and through the air passage 30 in the inner cylinder shell 29, will cause the heating of the air to a very high degree of temperature to be continuously disseminated through the multiplicity of openings 6 in the casing 4 for heating the chamber in which my improved heating apparatus may be located.

The separated admixture of the gas and air to form the fuel and the arrangement of the fuel spreader 11 and burner plates 12 and 13, in the manner stated, provide important features of the present invention in establishing perfect combustion and a high degree of temperature on a minimum fuel consumption.

It is, of course, evident that changes in the contuor, form, proportions and details of construction may be resorted to without departing from the spirit or sacrificing any advantages of the invention.

The present invention provides a most efficient device of its kind, which may be safely and economically operated for heating purposes in an individual stove, as herein disclosed, or when embodied in a heating installation of the usual hot air system.

What I claim is:

1. In combination, a heating apparatus, of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, and a flue element communicating with said heating cylinder.

2. In combination, a heating apparatus, of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, and a flue element communicating with said heating cylinder, said heating cylinder providing a heating chamber communicating with said fire pot through apertures formed in said flame spreader.

3. In combination, a heating apparatus, of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, and a flue element communicating with said heating cylinder, said burner element including a perforated conically shaped fuel spreader and a pair of perforated superposed burner plates disposed above said fuel spreader.

4. In combination, a heating apparatus, of the character described, comprising a base, a fire pot mounted on said base, a burner element mounted on said base and extending into said fire pot, a flame spreader mounted on said firepot and disposed above said burner element, a heating cylinder mounted on said fire pot, a casing providing a hot air chamber enclosing said heating cylinder and said fire pot, and a flue element communicating with said heating cylinder, said heating cylinder providing a heating chamber communicating with said fire pot through recesses formed in the peripheral edge margins of said flame spreader.

5. In combination, a heating apparatus, of the character described, comprising a base, a fire pot mounted on said base, a burned element mounted on said base and extending into said fire pot, a flame spreader mounted on said fire pot and disposed above said burner element, a heating cylinder mounted on said fire pot, a casing providing a hot air chamber enclosing said heating cylinder and said fire pot, and a flue element communicating with said heating cylinder, said burner element including a perforated conically shaped fuel spreader and a pair of perforated superposed burner plates disposed above said fuel spreader, said heating cylinder providing a heating chamber communicating with said fire pot through recesses formed in the peripheral edge margins of said flame spreader.

6. In combination, a heating apparatus, of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, and a flue element communicating with said heating cylinder, said burner element including a perforated conically shaped fuel spreader and a pair of perforated superposed burner plates disposed above said fuel spreader, said heating cylinder consisting of an inner and an outer shell providing a heating chamber having a closed upper end and further providing an air passage through said inner shell having an open upper end communicating with said hot air chamber.

7. In combination, a heating apparatus of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, a flue element communicating with said heating cylinder, said burner element including a perforated conically shaped fuel spreader and a pair of perforated superposed burner plates disposed above said fuel spreader, said heating cylinder consisting of an inner and an outer shell providing a heating chamber having a closed upper end and further providing an air passage through said inner shell having an open upper end communicating with said hot air chamber, said heating chamber communicating with said fire pot through recesses formed in the peripheral edge margins of said flame spreader.

8. In combination, a heating apparatus, of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, a flue element communicating with said heating cylinder, said burner element including a perforated conically shaped fuel spreader and a pair of perforated superposed burner plates disposed above said fuel spreader, said heating cylinder consisting of an inner and an outer shell providing a heating chamber having a closed upper end and further providing an air passage through said inner shell having an open upper end communicating with said hot air chamber, said heating chamber communicating with said fire pot through recesses formed in the peripheral edge margins of said flame spreader, said flame spreader including a pair of intersecting air passages communicating with said hot air chamber and with the air passage of said inner shell.

9. In combination, a heating apparatus, of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, a flue element communicating with said heating cylinder, and separated fuel conduits communicating with said burner element for supplying gas and air to the latter from outlets spaced from each other.

10. In combination, a heating apparatus, of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, a flue element communicating with said heating cylinder, said burner element including a perforated conically shaped fuel spreader and a pair of perforated superposed burner plates disposed above said fuel spreader, said heating cylinder providing a heating chamber communicating with said fire pot through recesses formed in the peripheral edge margins of said flame spreader, and separated fuel conduits communicating with said burner element for supplying gas and air to the latter from outlets spaced from each other.

11. In combination, a heating apparatus of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, a flue element communicating with said heating cylinder, said burner element including a perforated conically shaped fuel spreader and a pair of perforated superposed burner plates disposed above said fuel spreader, said heating cylinder consisting of an inner and an outer shell providing a heating chamber having a closed upper end and further providing an air passage through said inner shell having an open upper end communicating with said hot air chamber, said heating chamber communicating with said fire pot through recesses formed in the peripheral edge margins of said flame spreader, and separated fuel conduits communicating with said burner element for supplying gas and air to the latter from outlets spaced from each other.

12. In combination, a heating apparatus, of the character described, comprising a base, a fire pot mounted on said base, a burner element mounted on said base and extending into said fire pot, a flame spreader mounted on said fire pot and disposed above said burner element, a heating cylinder mounted on said fire pot, a casing providing a hot air chamber enclosing said heating cylinder and said fire pot, a flue element communicating with said heating cylinder, said burner element including a perforated conically shaped fuel spreader and a pair of perforated superposed burner plates disposed above said fuel spreader, said heating cylinder consisting of an inner and an outer shell providing a heating chamber having a closed upper end and further providing an air passage through said inner shell having an open upper end communicating with said hot air chamber, said heating chamber communicating with said fire pot through recesses formed in the peripheral edge margins of said flame spreader, said flame spreader including a pair of intersecting air passages communicating with said hot air chamber and with the air passage of said inner shell, and separated fuel conduits communicating with said burner element for supplying gas and air to the latter from outlets spaced from each other.

In testimony whereof I affix my signature.

MICHAEL ZIPPLER, Jr.